United States Patent [19]
Fujimoto

[11] Patent Number: 6,061,177
[45] Date of Patent: May 9, 2000

[54] INTEGRATED COMPUTER DISPLAY AND GRAPHICAL INPUT APPARATUS AND METHOD

[76] Inventor: Kenneth Noboru Fujimoto, 200 Kelp St., Manhattan Beach, Calif. 90266

[21] Appl. No.: 08/769,997

[22] Filed: Dec. 19, 1996

[51] Int. Cl.⁷ .............................. G03B 21/56; G09G 5/00
[52] U.S. Cl. ............................................ 359/443; 345/175
[58] Field of Search .................................... 345/157, 158, 345/173, 175, 176; 359/443, 453, 455, 456, 457, 400

[56] References Cited

U.S. PATENT DOCUMENTS

| | | | |
|---|---|---|---|
| 3,846,826 | 11/1974 | Mueller | 358/81 |
| 4,305,071 | 12/1981 | Bell et al. | 340/712 |
| 4,346,376 | 8/1982 | Mallos | 340/712 |
| 4,484,179 | 11/1984 | Kasday | 340/365 P |
| 4,542,375 | 9/1985 | Alles et al. | 340/712 |
| 4,561,017 | 12/1985 | Greene | 358/93 |
| 4,707,689 | 11/1987 | DiPiazza et al. | 340/706 |
| 4,843,568 | 6/1989 | Krueger et al. | 364/518 |
| 5,025,314 | 6/1991 | Tang et al. | 358/93 |
| 5,105,186 | 4/1992 | May | 340/784 |
| 5,181,108 | 1/1993 | Greene | 358/93 |
| 5,239,373 | 8/1993 | Tang et al. | 358/93 |
| 5,268,679 | 12/1993 | Shannon | 345/4 |
| 5,317,140 | 5/1994 | Duuthorn | 250/221 |
| 5,376,947 | 12/1994 | Kuroda | 345/173 |
| 5,483,261 | 1/1996 | Yasutake | 345/173 |
| 5,528,266 | 6/1996 | Arbeitman et al. | 345/173 |
| 5,623,280 | 4/1997 | Akins et al. | 345/104 |
| 5,726,685 | 3/1998 | Kuth et al. | 345/173 |
| 5,742,279 | 4/1998 | Yamamoto et al. | 345/173 |

*Primary Examiner*—Safet Metjahic
*Assistant Examiner*—Christopher E. Mahoney
*Attorney, Agent, or Firm*—Hale and Dorr LLP

[57] ABSTRACT

A touch screen input device and method for use with a rear-mounted video output projection system incorporates a transparent sheet preferably having substantially parallel top and bottom surfaces as the touch screen panel. A rear-mounted light source projects light onto the rear surface of the touch screen panel, on which a diffusing surface is imposed, with the result that some of the light from the light source is totally internally reflected within the touch screen panel and is imaged by a rear-mounted video camera. When the front surface of the touch screen panel is touched by a finger or rubbery object, total internal reflection is interrupted and the video camera images the touch as a dark spot. Because the touch screen panel is a sheet having substantially parallel surfaces, the video output system with which the input device is designed to be used is a projection system, and the technology used to detect touches is optical imaging, the touch screen input device can be readily scaled up to desktop or large work-surface sizes. The touch screen input device operates equally well in an environment with any level of ambient light or no ambient light and can simultaneously detect multiple touches. The touch screen input device remains operative while books or other common desktop objects are left resting on portions of the touch screen panel.

32 Claims, 6 Drawing Sheets

INTEGRATED COMPUTER DISPLAY AND GRAPHICAL INPUT APPARATUS AND METHOD

BACKGROUND OF THE INVENTION

Touch screens function as both input and output tools for a variety of computerized devices, including general purpose computers as well as specialized machines. As input devices, they allow computer users to provide input to their computers by touching screens, either manually, with light pens, with magnetic styli, or with other objects. As output devices, they provide computer users with information in video form. These functional descriptions characterize most, if not all, touch screens; however, existing touch screens vary considerably in their underlying technologies.

While a variety of alternative touch screen technologies is currently available, available alternatives are not ideal for all applications. In particular, one family of touch screen applications that is not adequately supported by currently available underlying technologies is large desktop or work-surface touch screens. Such touch screens could provide tools useful for operating many existing computer graphics applications. For example, large, detailed drawings and schematics generated by architectural, mechanical engineering, and electrical engineering software could be more easily viewed and modified using desk-sized touch screens than using smaller, more conventional, monitor-based touch screens. Similarly, desk-sized touch screens would be useful in complex control panel applications, such as audio mixing consoles and industrial plant control panels. Desk-sized touch screens would be useful in computerized public-access information kiosks. Finally, large touch screens for office applications such as word processing and spreadsheets that run on windowing operating systems would be useful in many settings.

Conventional technologies fail to support large desktop or work-surface touch screens in two ways. First, the technologies underlying the output components of touch screens have previously made large output displays impracticable for many applications. Traditional CRT and LCD output displays cannot easily be scaled up to screen sizes with greater than 30" diagonals. Second, the touch sensor technologies underlying the input components of touch screens have heretofore been unable to provide large work screens capable of simultaneously detecting multiple touches, capable of operating without interference while stacks of books, telephones, and other common work-surface objects are resting on them, capable of simultaneously functioning as both the touch surface for receiving input and the display surface for providing output, and also capable of providing these characteristics in a form that does not require the work screen surface to be part of a large prism or other bulky, heavy, expensive, or otherwise impracticable component.

Large output displays can now be provided by digital micromirror technology. Digital micromirror projection displays can easily be scaled up to desk-sized screens without becoming excessively bulky or heavy, without dramatically increasing cost, and without becoming otherwise impracticable. Furthermore, video display technologies other than micromirror projection displays that increase the feasibility of large work-surface touch screens might develop in the future. Projection display technologies now make the output components of large, desk-sized touch screens practicable; however, existing touch sensor technologies fail to make the input components of large touch screens practicable in one or more of a number of respects.

Existing touch screens incorporate a number of alternative technologies for sensing touches. These technologies include at least the following variations: (1) touch screens comprised of layers of clear flexible plastic and of sensors that detect changes in conductivity or capacitance when pressure is applied to the layers of plastic; (2) touch screens comprised of sensors that detect interruptions in surface acoustic wave or linear LED arrays when screens are touched; (3) touch screens comprised of sensors that detect touches by light pens or magnetic styli; (4) touch screens comprised of photodiodes that respond to totally internally reflected light generated within the screens when CRT raster signals scan over touch points on screen surfaces and of devices that determine precise raster positions for times when photodiode responses are detected; (5) touch screens comprised of prisms within which light from a light source is totally internally reflected, and of cameras positioned to only detect light totally internally reflected, such that when the screen surface is touched, light from the light source is no longer totally internally reflected into view of the camera; and (6) touch screens comprised of panels through which ambient light reaches cameras such that the cameras can detect shadows where the panels are touched.

Pressure-sensitive touch screens, surface acoustic wave touch screens, and linear LED array touch screens are generally impracticable for use where simultaneous detection of multiple touch points is desired. These types of touch sensors also cannot operate when stacks of books or other objects are left sitting on portions of touch screen surfaces. Both the capability of simultaneously detecting multiple touches and the capability of operating with objects sitting on the screen surface are desirable in a desk-surface touch screen.

Touch screens that detect touches by magnetic styli or light pens require users to make their touches with a stylus or light pen and often are sensitive to how such stylus or light pen is oriented relative to the screen when touches are made. Styli and light pens can also become misplaced and are generally less convenient to use than are users' fingers. In addition, light pens generally depend upon CRT raster signals for their operation, and thus are not readily adapted for use with micromirror projection displays. As noted above, CRT output devices are not easily scaled up to desk-sized screens.

Touch screens that rely upon the timing of CRT raster signals are generally limited to uses that incorporate CRT output devices and are not ideal for use with projection displays that do not incorporate CRT devices. As discussed above, CRT screens cannot readily be scaled-up to desk-surface sizes. An example of a touch screen that relies upon the timing of CRT raster signals is the device disclosed in U.S. Pat. No. 4,346,376 issued to Mallos, which is a device in which light from a raster signal is totally internally reflected within a screen panel with substantially parallel surfaces when a finger or other object touches the outer screen surface. The touch of a finger or other object on the outer screen surface causes light to reflect in a variety of directions within the screen panel, some of which are at angles conducive to total internal reflection. By identifying the precise time when photodiodes detect total internal reflection and matching that time to a known raster signal position for that time, the Mallos device identifies touch positions.

Prisms, such as those disclosed in U.S. Pat. No. 4,561,017 issued to Greene, can provide most of the performance characteristics desirable in a desk-sized touch screen; however, a desk-sized prism filled with water or oil would be heavy, expensive, and impracticable. Greene's device provides a prism into which light from a light source enters through a face not substantially parallel to the touch surface and totally internally reflects from the touch surface face of the prism; and a camera positioned to capture only light that has been totally internally reflected from the touch surface of the prism. When the touch surface of the prism is touched, light rays from the light source that previously reflected internally off the touch surface of the prism no longer are reflected. The interruption in total internal reflection is a result of the object used to make the touch displacing the layer of ambient air above the touch screen adjacent to the touch point. When the layer of air is present (i.e. when the surface is not being touched), rays of light internally reflect off the touch surface and into the view of the camera as a result of the angle at which the rays strike the touch surface and of the difference in the indices of refraction for the air and for the prism material (the index for air is significantly lower). When the air is displaced by a touch, the difference in the indices of refraction is significantly reduced, and light rays striking the screen surface at the touch points no longer are totally internally reflected into the view of the camera. Greene's device requires a large prism so that only internally reflected light from the light source reaches the camera; a touch screen comprised of a sheet of transparent material would not be compatible with Greene's invention because such a sheet would permit ambient light as well as totally internally reflected light to reach the camera. Greene's device also requires the use of a prism so that total internal reflection will occur at all, since total internal reflection of light originating from outside a sheet of transparent material having substantially parallel top and bottom surfaces ordinarily will not occur within such a sheet. In other words, Greene facilitates the occurrence of total internal reflection by providing a prism with a face not substantially parallel to the touch surface through which light from a light source can enter.

Devices that comprise panels through which ambient light reaches cameras such that touching the panels creates shadows that are imaged by the cameras, such as the device disclosed in U.S. Pat. No. 5,483,261 issued to Yasutake, are limited in two ways. First, such devices rely upon at least some ambient light for their operation. Second, such devices are not readily adapted to uses where the presence of a touch must be an all-or-nothing proposition, since shadows created when the touch object nears the touch screen but before an actual touch is made are difficult to distinguish from those created when an actual touch is made.

Accordingly, it is an object of the present invention to provide a touch sensor apparatus than can readily be scaled up to a desk-sized work surface. It is also an object of the present invention to provide a touch sensor apparatus that can simultaneously detect multiple touch points and can continue to operate when objects are left resting on a part of the touch surface. Another object of the present invention is to provide a touch sensor apparatus whose touch screen panel can also be used as an output screen for a projection display. A further object of the present invention is to provide a touch sensor apparatus in which the touch screen panel is not integrated into a large prism or other bulky configuration. Yet another object of the present invention is to provide a touch sensor apparatus that senses touches only when actual contact by a finger-sized object is made with the touch screen touch surface. Still yet another object of the present invention is to provide a touch sensor apparatus that can operate regardless of the level of ambient light or without ambient light.

SUMMARY OF THE INVENTION

The present invention is a touch-sensing apparatus incorporating a touch screen panel adapted for use with a rear-projected computer display. The invention enables users to view computer output information and to interact with the computer (it will be understood that the term "computer" can mean a general purpose computer or a more specialized machine) by touching the surface of the display. The particular characteristics of the invention are conducive to creating large screens that also function as work surfaces (e.g. horizontal desktop surfaces). The device can sense multiple touches and is more sensitive to touches by fingers and rubbery objects than by paper and cloth-covered objects. Since the touch screen system of the present invention uses projection for output display and optical imaging for sensing input, and because the screen of the present invention comprises a sheet with substantially parallel top and bottom surfaces rather than a bulkier or heavier format such as a large prism, the invention can easily be scaled up to desk-surface sizes.

The invention comprises a sheet of transparent material having substantially parallel top and bottom surfaces with a diffusing surface imposed on one surface and a smooth surface imposed on the other surface. The diffusing surface functions to refract, at various angles, light shined from a light source at a shallow angle to the diffusing surface. The refracted light then strikes the touch surface of the sheet at the various angles resulting from the refraction. The refracted light reaching the touch surface at angles to the surface normal greater than the critical angle is totally internally reflected off the touch surface.

The totally internally reflected light then passes back through the diffusing surface and is imaged by a video camera. When the touch surface is touched, total internal reflection at the touch point is interrupted as a result of the displacement of air, which has a significantly lower index of refraction than does the material of the transparent sheet or the material of the touch object. Because fingers and rubbery objects more effectively displace the layer of air adjacent to the screen when they are used to touch the screen than do paper and cloth-covered objects, the touch-sensing apparatus of the present invention is more sensitive to fingers and rubbery objects than to paper and cloth-covered objects. The video camera images the interruptions in total internal reflection as dark spots, which the computer, via an interface, interprets as touches. The dark spots are digitized and image processed by the interface to determine the coordinates of the touch points, which are then sent to the computer operating system.

The imposition of a diffusing surface on the surface of the transparent sheet opposite the touch surface enables some of the light originating from the light source outside the transparent sheet to be totally internally reflected within the transparent sheet. Without the use of a diffusing surface, total internal reflection of light originating from outside a transparent sheet ordinarily will not occur within a sheet having substantially parallel top and bottom surfaces. By contrast, total internal reflection will occur without a diffusing surface in a prism if light is introduced into the prism through a face of the prism not substantially parallel to the face from which the light is totally internally reflected. A diffusing surface can be created by sandblasting or otherwise abrading a surface of a piece of glass or plastic, by molding a plurality of convex or concave lenses to a surface of a transparent sheet, or by molding a coating having diffusing properties to a surface of a transparent sheet. Coatings having diffusing properties might include coatings having suspended particles in them or coatings having a varying refractive index (e.g. a holographic optical element).

Ambient light passing through the transparent sheet and light from the light source that reflects directly off the diffusing surface also reach the video camera of the present invention. Where the touch surface is touched, ambient light is blocked by the touch object at the touch point. Thus, ambient light reaching the video camera does not interfere with the detection of dark spots. Light reflected directly off the diffusing surface would interfere with the detection of dark spots, however, if a reference light level were not provided to the video camera. One solution to this problem is to provide an opaque border around the touch surface above the touch screen, or other opaque covering over some portion of the touch surface of the touch screen, so that the underside of the opaque border is illuminated by light from the light source. The video camera can then image light levels at the border area, or at the area covered by the opaque covering, as well as light levels at the central areas of the touch surface, and the interface can compare the two. Only dark spots in the areas of the touch surface darker than the light levels at the areas of the opaque border or covering are interpreted as touch points. Thus, in spite of the fact that light other than totally internally reflected light does reach the video camera, dark spots are only detected at points on the touch screen where total internal reflection has been interrupted.

A projection system is used to project the computer output information onto the diffusing surface. Variations in light levels within projected images would interfere with the detection of dark spots if some strategy for filtering out such variations were not incorporated in the touch sensor system. One solution to this problem is to make the light source an infrared source and the video camera an infrared camera, and to provide the projection system with a filter that blocks infrared light. Such a solution ensures that the projection system does not introduce any light into the area of the touch screen that could have an effect on the light imaged by the video camera.

These and other objects and features of the present invention will be more fully understood from the following detailed description which should be read in light of the accompanying drawings, in which corresponding reference numerals refer to corresponding parts throughout the several views.

BRIEF DESCRIPTION THE DRAWINGS

DETAILED DESCRIPTION OF PREFERRED EMBODIMENTS

Figure 1:
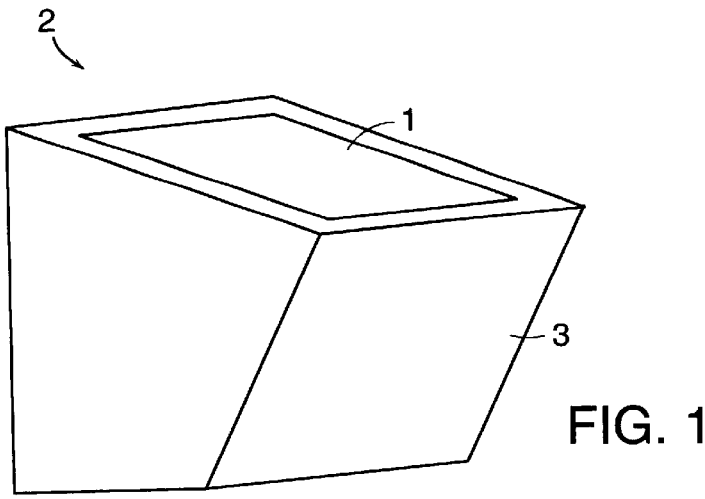
FIG. 1 is a perspective view of a touch screen system in a desktop or large work-surface embodiment of the present invention.

FIG. 1 is a schematic view of a large desktop or work-surface touch screen system 2, in which the touch surface 1 of the touch screen system 2 is visible and the other components of the touch screen system 2 of the present invention are not visible because they are located within the housing 3 of the touch screen system 2. In this embodiment, the touch surface 1, which is also the output display screen, may be horizontal or at a slight angle as depicted in the drawing. The present invention can be used in smaller formats (e.g., in traditional PC monitor-sized formats) as well as in large desktop or work-surface formats.

Figure 2:
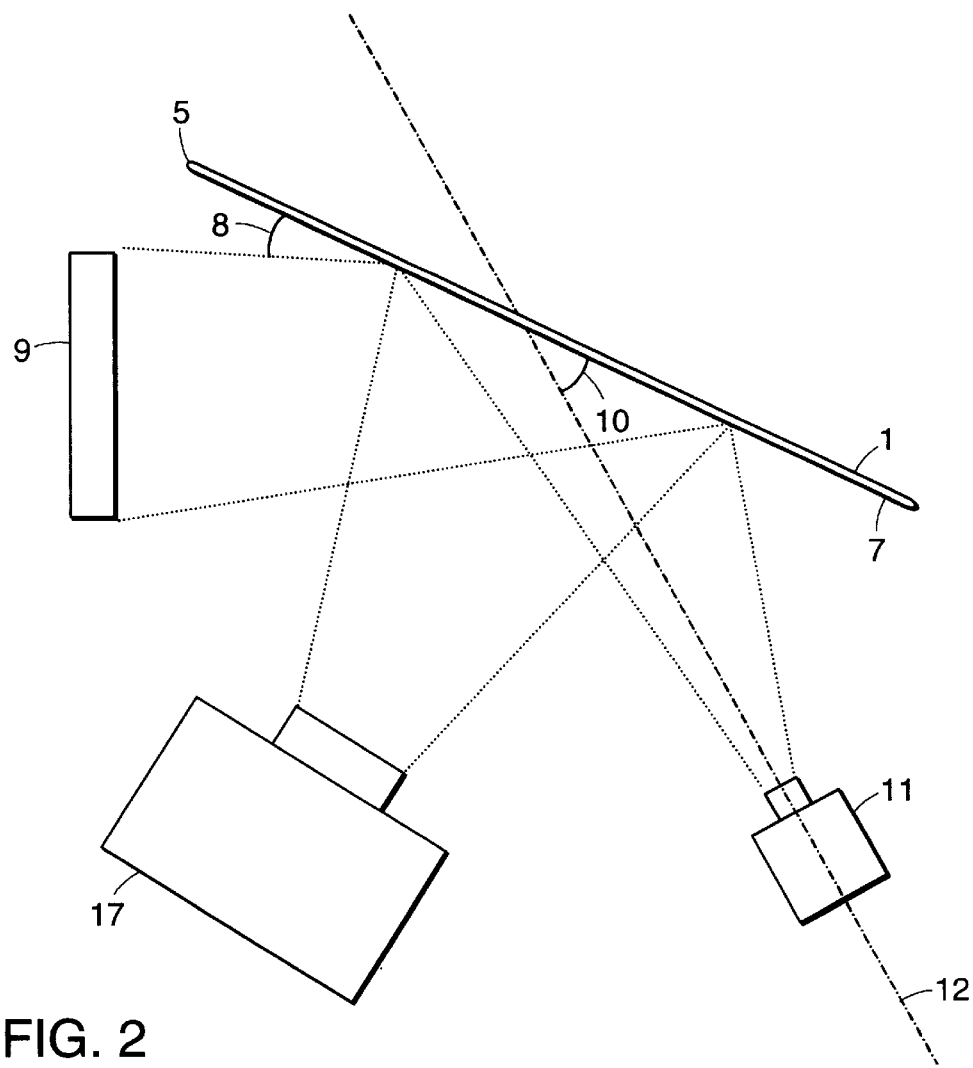
FIG. 2 is a shematic view of the basic components of the touch screen system shown in FIG. 1.
Figure 10:
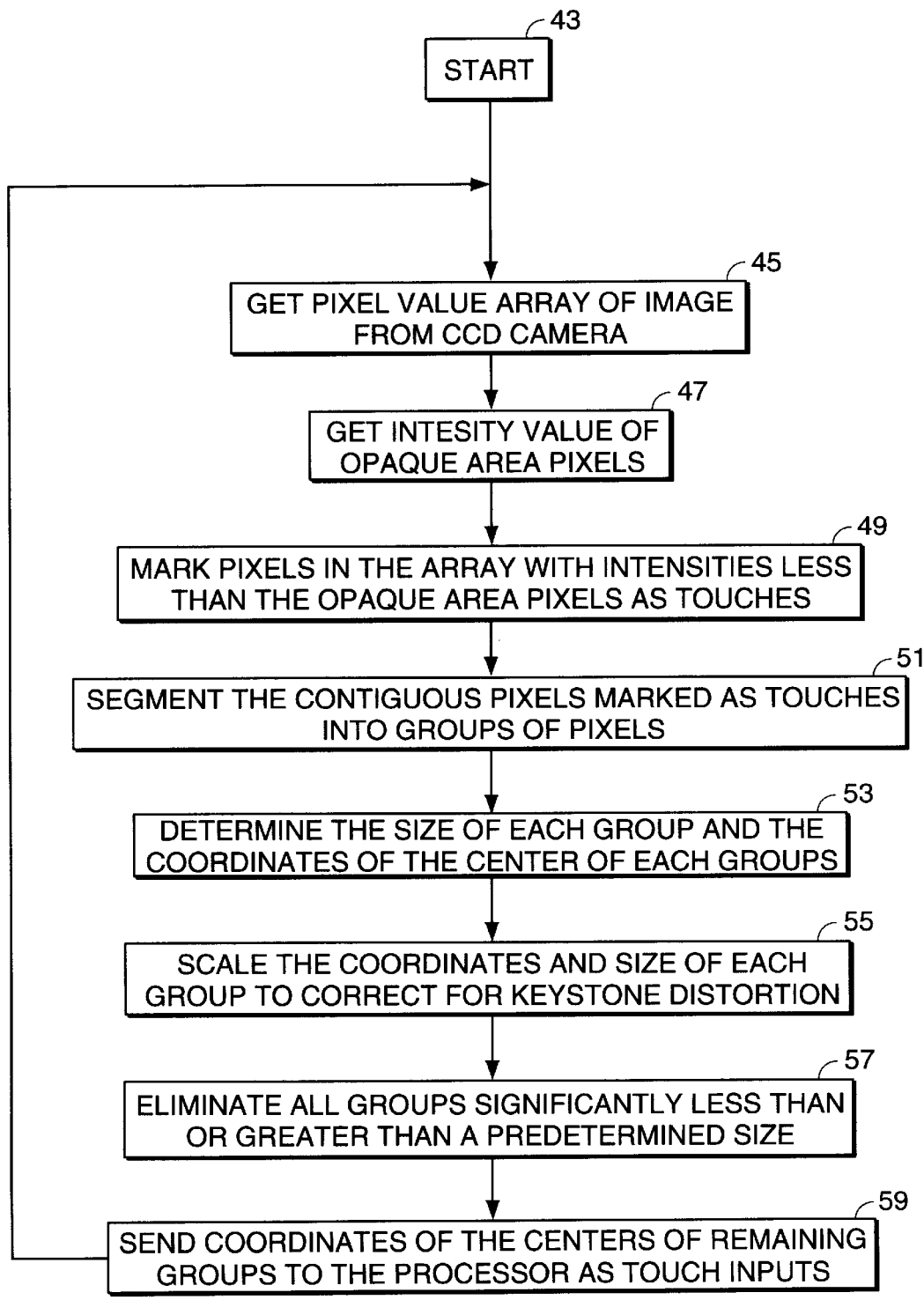
FIG. 10 is a flowchart of image processing functions applied to image data from the video camera shown in FIG. 5 by the interface shown in FIG. 5.

Referring to FIG. 2, the basic components of the present invention are shown. The touch screen system is comprised of a transparent sheet 5 having a touch surface 1, which is smooth, and a diffusing surface 7. A light source 9 projects light at a shallow angle 8 to the diffusing surface 7 onto the diffusing surface 7. In the preferred embodiment, this shallow angle 8 is approximately 30 degrees. Some of the light from the light source 9 totally internally reflects within the transparent sheet 5 and is imaged by the video camera 11, which can be any of a variety of imaging systems capable of imaging light and providing digital image data or analog image data that can be digitized (e.g., a Connectix Quick-Cam video camera can be adapted for this use, but such a camera does not have the capability of compensating for keystone distortion internally; rather, as discussed below, using such a camera would require that the image data be altered to correct for the distortion that results from imaging the diffusing surface 7 from the side with a camera having an optical axis at an angle to the diffusing surface 7 other than 90 degrees). In the preferred embodiment, the video camera 11 is positioned so that its optical axis 12 is at an angle 10 to the diffusing surface 7 that is approximately 30 degrees. The video camera 11 sends image data to the interface 13 (shown schematically in FIG. 5), which performs various image processing functions to determine the coordinates of touch points (FIG. 10 provides a flowchart of a possible series of image processing functions), digitizes them, and sends the digitized data to the computer operating system 15 (shown schematically in FIG. 5). A projection system 17, which is connected to the computer operating system 15, projects output information onto the diffusing surface 7 of the transparent sheet 5. In the preferred embodiment, the projection system 17 is positioned to project light directly onto the diffusing surface 7 (i.e., so that it projects light at approximately a 90 degree angle to the diffusing surface 7). The projection system 17 can be any of a variety of commercially available projection systems (e.g., a Proxima Desktop Projector 4100(DLP micromirror)).

Figure 3:
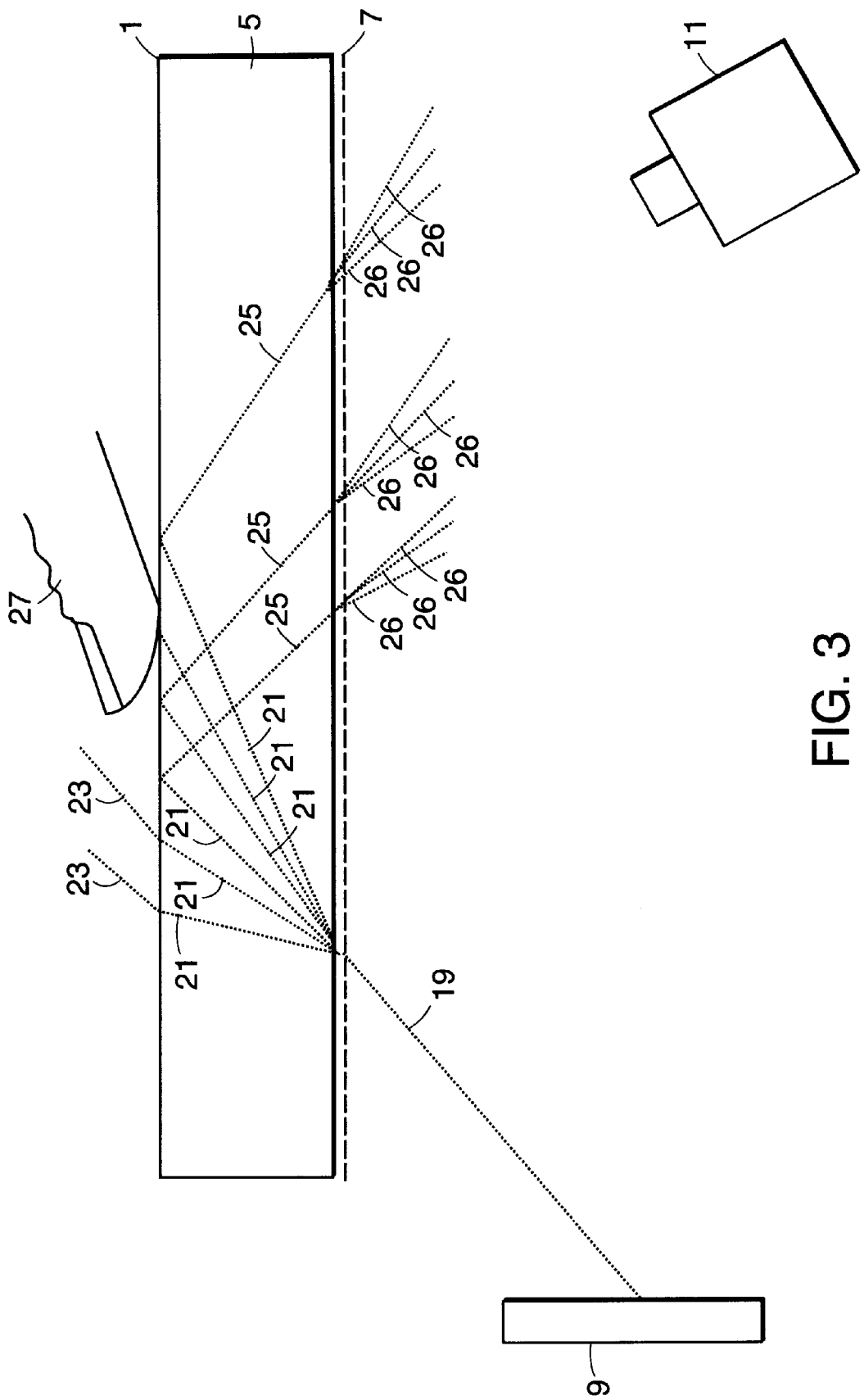
FIG. 3 is an illustration of how light that passes through the diffusing surface of the transparent sheet shown in FIG. 2 is refracted and totally internally reflected by the transparent sheet.

FIG. 3 demonstrates the total internal reflection of light from the light source 9, with the light indicated by dotted lines. For simplicity, only one ray of light 19 from the light source 9 is shown. When the incident ray of light 19 is projected onto the diffusing surface 7, the ray of light 19 refracts into the transparent sheet 5 at various angles, resulting in a plurality of rays 21. The plurality of rays 21 pass through the transparent sheet 5 until they reach the touch surface 1. Those rays 21 that strike the touch surface 1 at angles to the surface normal less than the critical angle refract through the touch surface 1 as rays 23. Those rays 21 that strike the touch surface 1 at angles to the surface normal greater than the critical angle are totally internally reflected as rays 25 from the touch surface 1. The critical angle is measured from a normal to the touch surface and is determined by Snell's Law, which determines the refraction of light at a boundary between two media through which light passes:

A sin X=B sin Y; where A=index of refraction of the first material through which light passes (in this case, the material of the transparent sheet), B=index of refraction of the second material through which light passes (in this case, the layer of ambient air adjacent to the touch surface), Y=angle between a normal to the touch surface and a ray of light after refracting at the touch surface, and X=angle between a normal to the touch surface and a ray of light before refracting at the touch surface. The critical angle is the value of X where Y=90 degrees. If A=1.5(the approximate index of refraction for glass) and B=1.0(the approximate index of refraction for air), then the critical angle is approximately 41.8 degrees.

When a finger 27 or other touch object displaces the ambient air adjacent to the touch surface 1, total internal reflection is interrupted. This phenomenon occurs because air has an index of refraction significantly lower than that for the material of the transparent sheet 5 or that for a finger 27 or other touch object. Where there is not a significant difference in indices of refraction, reflection does not occur. The layer of air adjacent to the touch surface 1 necessary for total internal reflection is very thin. Thus, paper- or cloth-covered objects (and, in some cases, fingers with very dry skin) might not effectively displace the layer, whereas most fingers or rubbery objects likely would displace the layer and thus interrupt total internal reflection. Those rays 25 that are totally internally reflected pass back through the diffusing surface 7, whereupon they refract at various angles as rays 26 and are imaged by video camera 11.

Figure 4:
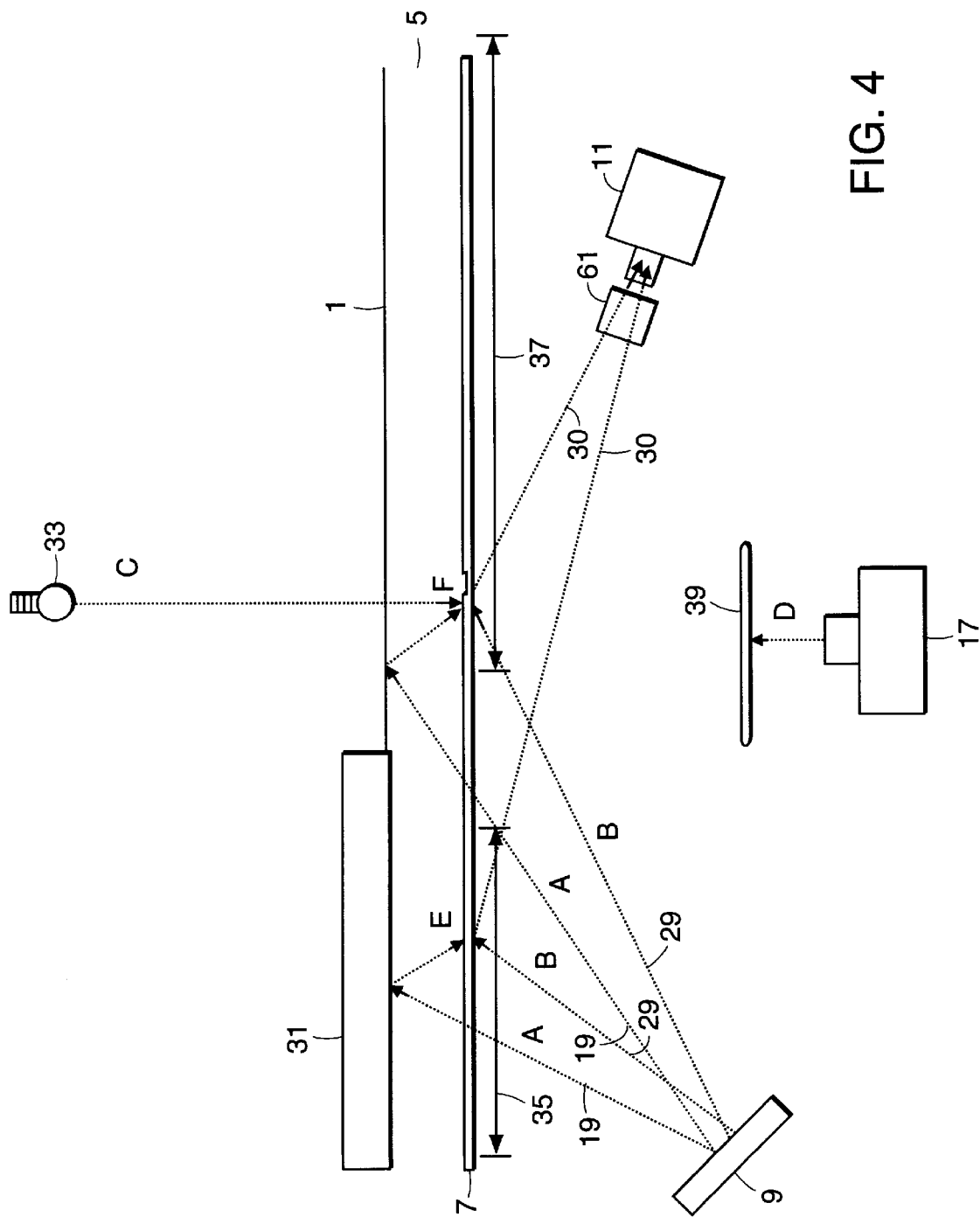
FIG. 4 is a schematic view of the various sources of light that potentially affect the detection of touches by the touch screen system components shown in FIG. 2 together with opauque covering and infrared blocking filter components.

Referring to FIG. 4, once again light is indicated by dotted lines and, for simplicity, only four rays of light from the light source 9 are shown. Some incident rays 29 originating from the light source 9 reflect directly off the diffusing surface 7 and are imaged by the video camera 11. Other incident rays 19, as described above, refract through the diffusing surface 7. The video camera 11 images rays of light 30 that are comprised of totally internally reflected light, light that reflects directly off the diffusing surface 7, and ambient light that transmits through the transparent sheet. The incident rays 29 represent a component of the light 30 imaged by the video camera 11 that is not first totally internally reflected within the transparent sheet 5. Since these incident rays 29 are not totally internally reflected, but rather reflect directly from the diffusing surface 7, they reach the video camera 11 regardless of touches on the touch surface 1. Since the light reaching the video camera 11 that has been reflected directly from the diffusing surface 7 is additive with the light that reaches the video camera 11 after total internal reflection within the transparent sheet 5, the light reflecting directly from the diffusing surface 7 tends to make the dark spots created by interruptions in total internal reflection resulting from touches appear lighter to the video camera 11. The dark spots will continue to appear darker to the video camera 11 than will the surrounding areas of the touch surface 1; however, the dark spots will appear lighter than they would in the absence of direct reflection of light from the light source 9 off the diffusing surface 7. Thus, the interface 13 must be given a reference light level so that it can determine what light level constitutes a dark spot. One solution to the problem of giving the interface 13 a reference light level is to provide an opaque covering 31 around the perimeter of the touch surface 1, or over some portion of the touch surface 1 other than the central areas needed for use as a display window for the output information projected by the projection system 17. The video camera 11 then images light equal to the sum of the internally reflected light and the light reflected directly from the diffusing surface for the areas 35 of the transparent sheet 5 covered with the opaque covering 31, which light is used by the interface 13 as the reference light level. By comparison, the video camera 11 images light equal to the sum of the internally reflected light, the light reflected directly from the diffusing surface 7, and any ambient light 33 transmitting through the transparent sheet 5 from the touch surface 1 side of the sheet for the central areas 37 of the sheet; however, where a touch occurs on the touch surface 1, ambient light is blocked and total internal reflection is interrupted (note that reflection is not completely stopped, but it is substantially reduced). The interface 13 can then interpret central areas 37 of the transparent sheet 5 that appear darker than the perimeter areas 35 of the transparent sheet 5 as touch spots. Algebraically, the above can be represented by:

Light imaged by video camera 11 at area 35 covered with opaque covering 31: E=A+B;

Light imaged by video camera 11 at central area 37 where no touch is occurring: F=A+B+C;

Light imaged by video camera 11 at central area 37 where a touch is occurring: F'=x(A)+B, where x is a fraction substantially smaller than one. Note that the touch effectively blocks all ambient light and interrupts most of the reflection at the touch point on touch surface 1;

Where A is totally internally reflected light, B is light reflected directly from the diffusing surface 7, and C is ambient light transmitted through the transparent sheet 5.

The interface 13 thus would interpret the image data from central area 37 as not representing a touch where the video camera 11 images light F=(A+B+C)>=E; however, the interface 13 would interpret the image data from central area 37 as representing a touch where the video camera 11 images light F'=[x(A)+B]<E. Providing a reference light level to the interface 13 ensures that dark spots resulting from touches appear relatively dark to the camera regardless of light from the light source 9 that reflects directly off the diffusing surface 7. However, light from the light source 9 that reflects directly off the diffusing surface 7 can still impede the operation of the touch screen input device by reducing the signal-to-noise ratio of the light signals imaged by the video camera 11. One way to mitigate this potential problem is to provide a polarizer 61 in front of the video camera 11 that filters out light reflected directly from the diffusing surface 7. Since the light that reflects directly off the diffusing surface 7 is predominantly of certain polarizations that comprise only nominal parts of the light that totally internally reflects, an appropriate polarizer (e.g., a Newport Corporation Broadband Polarization Beamsplitter Cube with center frequency of 830 nm, 10FC16.PB.5, can be adapted for this purpose, as can other polarizers for infrared light) can screen out much of the directly reflecting light without screening out the light that totally internally reflects. The result is an improved signal-to-noise ratio.

Referring again to FIG. 4, the projection system 17 projects output information onto the diffusing surface 7. Since the output from the projection system 17 would ordinarily comprise varying levels of light, the output could interfere with the detection of dark spots caused by touches. One solution for preventing such interference is to make the light source 9 an infrared light source (e.g., an array of 880 nm GaAlAs infrared LEDs) and the video camera 11 an infrared camera (e.g., a camera with an Edmund Scientific 880 nm interference filter, #A43,098 added to allow only infrared light to be imaged) and to provide an infrared blocking filter 39 (e.g., an Edmund Scientific hot mirror, #A43,452) between the projection system 17 and the diffusing surface 7. Alternatively, the light source 9 could be made an ultraviolet light source and the video camera 11 could be made an ultraviolet camera, and an ultraviolet blocking filter could be provided between the projection system 17 and the diffusing surface 7. Other solutions include: (i) choosing a frequency of light for the light source 9 and video camera 11 that is not produced by the projection system 17; (ii) turning the light source 9 and the video camera 11 on and off in a sequence corresponding to when the projection system 17 is turned off and on; and (iii) polarizing the light from the projection system 17 and placing a filter that blocks polarized light between the video camera 11 and the diffusing surface 7.

Figure 5:
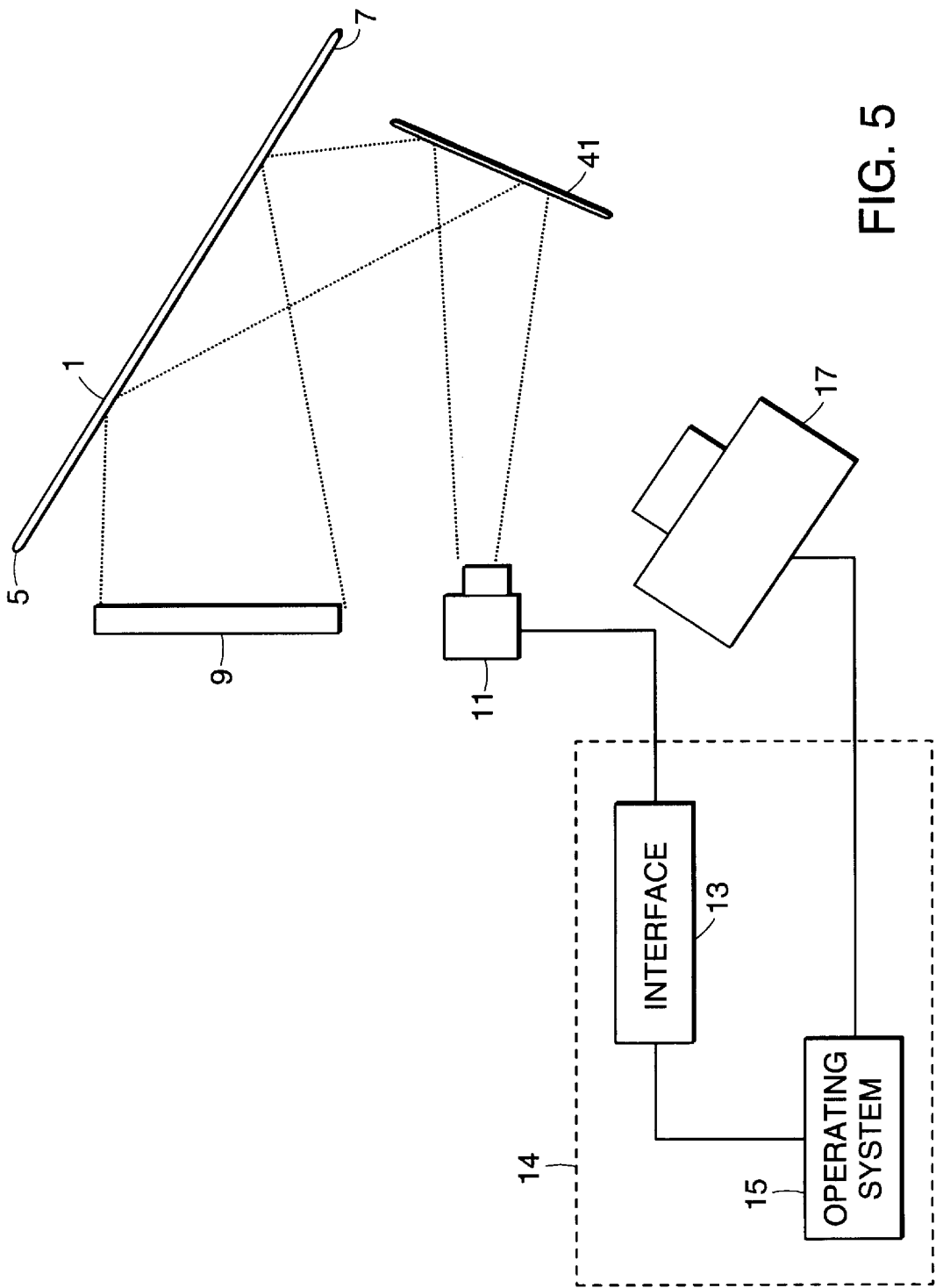
FIG. 5 is a schematic view of touch screen system components used in an alternative embodiment of the present invention.

FIG. 5 represents an alternative preferred embodiment in which a mirror 41 has been added to permit the light source 9, the video camera 11, and the transparent sheet 5 to be arranged more compactly. In this embodiment, light reflected from the transparent sheet 5 is further reflected against the mirror 41 before being imaged by the video camera 11. It will also be appreciated that optical components such as lightguides, lenses, mirrors, and holographic optical elements may be added to the present invention to alter the optical paths between the various components of the invention. FIG. 5 also illustrates the data flow through the touch screen system, from the video camera 11 to the interface 13 to the computer operating system 15 to the projection system 17. In the preferred embodiment, the video camera 11 provides digital image data output (e.g., a Connectix QuickCam video camera provides such digital output) to the interface 13, which is a unit separate from the computer operating system 15 having its own processor, which in turn performs image processing functions such as those described below in the detailed description of FIG. 10. One alternative embodiment is represented by dashed lines 14, which are included to indicate that the interface 13 can be integrated into the computer operating system 15. Other alternatives exist as well. For example, if the video camera 11 provides analog output, an analog-to-digital converter must be used to convert the output to digital data. Such a converter could be integrated into a single device with the interface 13 or the operating system 15, or both, or could be a separate device. Similarly, it is possible to integrate the interface 13 within the video camera 11. In short, it is possible to combine hardware components in various ways without changing the operation of the apparatus in any significant way.

Figure 6:
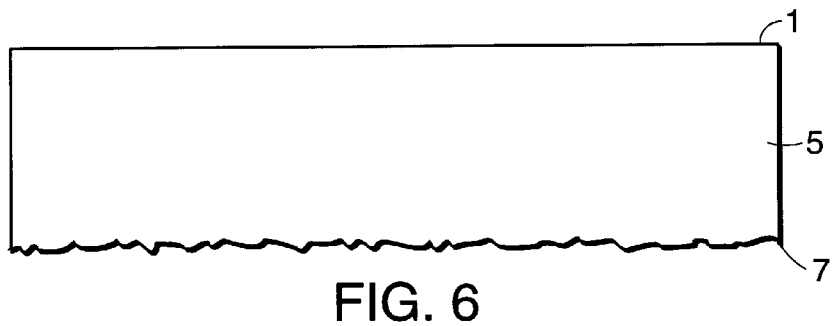
FIG. 6 is an elevational view of a transparent sheet used in the touch screen system of the prevention.

FIG. 6 is an elevational view of the transparent sheet 5, wherein the transparent sheet 5 is a glass or plastic sheet and the diffusing surface 7 has been created by sandblasting or otherwise abrading one surface of the glass sheet. The type of diffusing surface shown in FIG. 6 represents an easy-to-fabricate and therefore inexpensive alternative. Although glass or plastic sheets of various thicknesses can be used, sheets of approximately ¼" thickness may be most appropriate for many applications due to the tradeoff between cost and bulk on the one hand and durability on the other.

Figure 7:
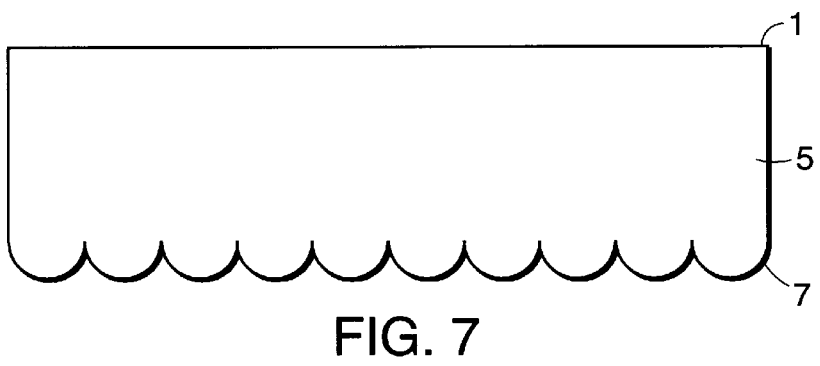
FIG. 7 is an elevational view of a transparent sheet used in an alternative embodiment of the present invention.
Figure 8:
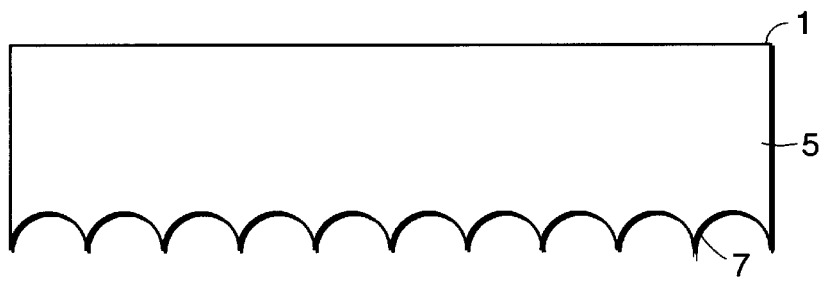
FIG. 8 is an elevational view of a transparent sheet used in an alternative embodiment of the present invention.

FIG. 7 is an elevational view of the transparent sheet 5, wherein the diffusing surface 7 has been created by molding convex lenses or hemispherical bumps onto one surface of the transparent sheet 5. FIG. 8 is an elevational view of the transparent sheet 5, wherein the diffusing surface 7 has been created by molding concave lenses or hemispherical indentations into one surface of the transparent sheet 5. The lenses of FIG. 7 and FIG. 8 can be formed by pouring or pressing heated glass or plastic into molds with indentations or, alternatively, by feeding heated plastic sheets through hot rollers with indentations or bumps that emboss the lenses. Creating a diffusing surface by molding lenses onto or into one surface of the transparent sheet requires that the lens size be less than a pixel in area so that light from all the pixels will reach a viewer's eye. A diffusing surface formed from lenses molded onto or into one surface of the transparent sheet creates a trade-off between viewing angle and brightness: the lenses focus light from the projection system 17 so that it appears brighter, but only within a narrowed field of view. By varying the size, focal length, exact shape, and symmetry of the lenses across the transparent sheet, the performance characteristics of such a diffusing surface could be optimized (a commercial example of such optimization can be found in some 41" Sony rear projection televisions, which have long vertical lenses molded into the front surface of the screen that improve the left-to-right viewing angle).

Figure 9:
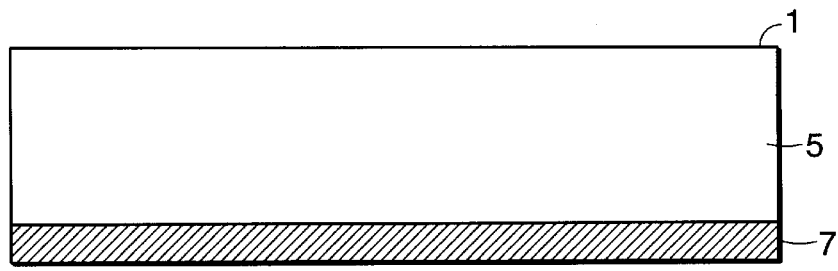
FIG. 9 is an elevational view of a transparent sheet used in an alternative embodiment of the present invention.

FIG. 9 is an elevational view of the transparent sheet 5, wherein the diffusing surface 7 is comprised of a diffusing coating on one surface of the transparent sheet 5. The diffusing coating could be a material with suspended particles, such as glass beads, in it, or a material with a varying refractive index, such as a holographic optical element. Holographic optical elements might include coatings comprising a photographic emulsion upon which a hologram is exposed or a transparent material upon which a hologram is embossed. Different coatings have different relative advantages in terms of fabrication costs, optical gain of the computer screen image, and field of view of the computer screen image.

As mentioned above, the interface 13 of the present invention must perform certain image processing functions before it can send touch data to the computer operating system 15. As discussed above, the interface 13 can be a device separate from the computer operating system 15 with a processor of its own, or it can be integrated into and share a processor with the computer operating system 15 (among other alternatives). FIG. 10 provides a flowchart of one series of image processing functions appropriate for use in the present invention. Once the interface 13 begins an iteration (step 43), it looks for data from the video camera 11 that represent the light intensities imaged for each pixel (step 45). The interface 13 then looks for data that represent the light intensity for pixels in the area of the opaque covering 31 (step 47). The interface 13 then compares the data from steps 45 and 47, and marks the pixels from step 45 with lower values than the pixels from step 47 as touches (step 49). The pixels marked as touches in step 49 are then grouped where they are contiguous (step 51). The size of each group and coordinates for the center of each group are then determined (step 53). Since the surfaces of the transparent sheet 5 are not parallel to the focal plane of the video camera 11, a correction must be made to the size and coordinates for each touch to compensate for keystone distortion (step 55). The correction of step 55 would consist of applying numeric scaling methods to the data; however, it should be recognized that it is likely possible to build special cameras that compensate for keystone distortion through the optical geometry of their components. Also, since the video camera 11 is on the opposite side of the transparent sheet 5 from the touch surface 1, the coordinates must corrected to compensate for the inverted image. Touches that are significantly larger or smaller than a predetermined size (i.e., a size approximately equal to the area of a finger tip) are then eliminated, so that only touches within the desired size range are recognized as touches (step 57). Thus, larger touches such as touches from elbows, arms and other objects left resting on the touch surface 1 are not recognized as touches. Finally, the coordinates of the remaining, approximately finger tip-sized, touches are sent to the computer operating system 15 as touch inputs (step 59).

While specific embodiments of the invention have been illustrated and described herein, it is realized that numerous modifications and changes will occur to those of ordinary skill in the art. It is therefore to be understood that the appended claims are intended to cover all such modifications and changes as fall within the true scope of the invention.

I claim:

1. A touch screen input device, which comprises:
   a transparent sheet having a first surface and a second surface, the transparent sheet having an index of refraction greater than that of air, and the first surface being a smooth surface defining a touch surface of the touch screen input device;
   a diffusing surface imposed on the second surface of the transparent sheet;
   a light source positioned in proximity to the second surface so that the second surface is closer than the first surface to the light source, and positioned to project light onto the diffusing surface of the transparent sheet, and so that when light is projected onto the diffusing surface some light refracts as said some light passes through the diffusing surface and reflects within the transparent sheet when said some light reaches the first surface; and
   a camera positioned in proximity to the second surface so that the second surface is closer than the first surface to the camera, and positioned to image light emanating from the second surface of the transparent sheet;
   whereby reflection of light within the transparent sheet is interrupted where the touch surface is being touched and light emanating from the second surface is thereby reduced.

2. The touch screen input device of claim 1, further comprising a video projection system located off the second surface of the transparent sheet and positioned to project light images onto the diffusing surface of the transparent sheet.

3. The touch screen input device of claim 2, further comprising a data computing machine, an interface for performing image processing functions to identify the locations of touches on the touch surface of the transparent sheet, a first data-link connecting the camera to the interface, a second data-link connecting the interface to the data computing machine, and a third data-link connecting the data computing machine to the video projection system so that the data computing machine can provide output data to the video projection system.

4. The touch screen input device of claim 2, wherein the light source is an infrared light source and the camera is an infrared camera.

5. The touch screen input device of claim 2, wherein the light source is an ultraviolet light source and the camera is an ultraviolet camera.

6. The touch screen input device of claim 4, further comprising an infrared blocking filter interposed between the video projection system and the diffusing surface, whereby the infrared blocking filter prevents light from the video projection system from affecting the image data received by the camera.

7. The touch screen input device of claim 5, further comprising an ultraviolet blocking filter interposed between the video projection system and the diffusing surface, whereby the ultraviolet blocking filter prevents light from the video projection system from affecting the image data received by the camera.

8. The touch screen input device of claim 2, further comprising synchronized controllers connected to the light source, camera, and video projection system that turn on and off the light source and the camera, on the one hand, and the video projection system, on the other, in alternating fashion, whereby light from the video projection system does not affect the image data received by the camera.

9. The touch screen input device of claim 2, wherein the light source emits, and the camera receives, only light of a frequency range outside the frequency range projected by the video projection system.

10. The touch screen input device of claim 2, wherein the light source emits, and the camera receives, only light of a given frequency range, and further comprising a blocking filter that blocks light of the given frequency range interposed between the video projection system and the diffusing screen, whereby the light from the video projection system does not affect the image data received by the camera.

11. The touch screen input device of claim 1, further comprising an opaque covering located adjacent the transparent sheet on some portion of the smooth surface of the transparent sheet.

12. The touch screen input device of claim 11, further comprising a processor and a data-link connecting the camera to the processor, wherein the processor includes means for comparing image data from the camera corresponding to the portion of the transparent sheet adjacent the opaque covering with image data from the camera corresponding to the portion of the transparent sheet not adjacent the opaque covering, and means for identifying touches only where the image data corresponding to the portion of the transparent sheet not adjacent the opaque covering represent spots darker than the light level represented by the image data corresponding to the portion of the transparent sheet adjacent the opaque covering.

13. The touch screen input device of claim 1, wherein the transparent sheet is a glass sheet and the diffusing surface is created by sandblasting the second surface of the transparent sheet.

14. The touch screen input device of claim 1, wherein the diffusing surface comprises a plurality of concave lenses formed in the second surface of the transparent sheet.

15. The touch screen input device of claim 1, wherein the diffusing surface comprises a plurality of hemispherical indentations formed in the second surface of the transparent sheet.

16. The touch screen input device of claim 1, wherein the diffusing surface comprises a plurality of convex lenses formed on the second surface of the transparent sheet.

17. The touch screen input device of claim 1, wherein the diffusing surface comprises a plurality of hemispherical bumps formed on the second surface of the transparent sheet.

18. The touch screen input device of claim 1, wherein the diffusing surface is a coating with particles suspended in it applied to the second surface of the transparent sheet.

19. The touch screen input device of claim 18, wherein the particles suspended in the coating are spherical beads.

20. The touch screen input device of claim 1, wherein the diffusing surface is a coating with a varying refractive index.

21. The touch screen input device of claim 20, wherein the coating is a holographic optical element.

22. The touch screen input device of claim 21, wherein the holographic optical element is a photographic emulsion upon which a hologram is exposed.

23. The touch screen input device of claim 21, wherein the holographic optical element is a transparent material upon which a hologram is embossed.

24. The touch screen input device of claim 1, wherein the diffusing surface breaks some of the light rays from the light source into pluralities of rays as the rays refract through the diffusing surface.

25. The touch screen input device of claim 24, wherein the diffusing surface causes some rays of the pluralities of rays to strike the touch surface at angles resulting in total internal reflection within the transparent sheet where the rays strike points on the touch surface adjacent to a layer of air, but does not cause the rays to strike the touch surface at angles resulting in total internal reflection where the rays strike points on the touch surface where a layer of adjacent air has been displaced by a touch.

26. The touch screen input device of claim 25, wherein the total internal reflection within the transparent sheet causes some rays to pass back through the diffusing surface and to be imaged by the camera.

27. The touch screen input device of claim 26, wherein the camera receives images of the areas corresponding to touch spots that are darker than the images the camera receives corresponding to other areas.

28. The touch screen input device of claim 27, wherein the camera provides data that represent the images to an interface for an operating system of a data computing machine.

29. The touch screen input device of claim 1, further comprising a polarizer disposed between the camera and the transparent sheet.

30. The touch screen input device of claim 1, wherein the diffusing surface is created by abrading the second surface of the transparent sheet.

31. A method for identifying where a touch screen of a touch screen input device is being touched, the touch screen input device having a screen panel with substantially parallel top and bottom surfaces, the top surface forming a touch surface and the bottom surface forming a diffusing surface, a light source for projecting light onto the diffusing surface, and an imaging means for imaging light from the bottom surface, the method comprising the steps of:

projecting light onto the diffusing surface of the screen panel using the light source, such that some of the projected light passes through the diffusing surface and is totally internally reflected within the screen panel; and imaging the projected light that is totally internally reflected within the screen panel and that passes back through the bottom surface of the screen panel with the imaging means, such that areas on the bottom surface that are imaged as relatively dark compared to other areas on the bottom surface are identified as touch areas.

32. A method for providing a reference light level to an imaging means in a touch screen input device, the touch screen input device having a screen panel with substantially parallel top and bottom surfaces, the top surface forming a touch surface having central areas and perimeter areas, and the bottom surface forming a diffusing surface having central areas and perimeter areas that correspond to the central areas and perimeter areas of the touch surface; a light source for projecting light onto the diffusing surface; the imaging means for imaging light from the bottom surface; and an opaque covering positioned on some portion of the perimeter areas of the touch surface such that ambient light does not transmit through the opaque covering, the method comprising the steps of:

projecting light onto the perimeter areas of the diffusing surface of the screen panel corresponding to the portion of the perimeter areas of the touch surface on which the opaque covering is positioned using the light source, such that some of the projected light passes through the diffusing surface and is totally internally reflected within the screen panel and some of the projected light reflects directly off the perimeter areas of the diffusing surface corresponding to the portion of the perimeter areas of the touch surface on which the opaque covering is positioned; and imaging the projected light that is totally internally reflected within the screen panel and that passes back through the perimeter areas of the diffusing surface corresponding to the portion of the perimeter areas of the touch surface on which the opaque covering is positioned and the projected light that reflects directly off the perimeter areas of the diffusing surface corresponding to the portion of the perimeter areas of the touch surface on which the opaque covering is positioned with the imaging means, such that the imaged light from the perimeter areas of the diffusing surface corresponding to the portion of the perimeter areas of the touch surface on which the opaque covering is positioned provides a reference light level for comparison with imaged light from the central areas of the diffusing surface.

* * * * *